Patented Nov. 1, 1938

2,135,451

UNITED STATES PATENT OFFICE 2,135,451

ORGANIC ACID SYNTHESIS

Donald J. Loder, Wilmington, Del., assignor to E. I. du Pont de Nemours & Company, Wilmington, Del., a corporation of Delaware No Drawing. Application July 13, 1935, Serial No. 31,208

20 Claims. (Cl. 260—532)

This invention relates to a process for the formation of organic acids and particularly to the preparation of aliphatic carboxylic acids by the interaction of aliphatic alcohols and carbon monoxide in the presence of a condensing agent.

Numerous processes have been proposed for the preparation of organic acids and their esters by the interaction in the vapor phase of organic compounds with the oxides of carbon. For example, it has been shown that by the vapor phase condensation of methyl alcohol with carbon monoxide in the presence of a suitable catalyst, acetic acid and methyl acetate may be prepared in proportions which are governed by the particular operating conditions. It has been suggested that aliphatic acids may be prepared from methane and carbon monoxide, from carbon monoxide and water vapor, and from ethers and carbon monoxide. These processes, however, have been conducted in the vapor phase at elevated temperatures and, generally, under superatmospheric pressures. As the result of the acidic nature of the catalyst and/or the products produced, difficulty has been encountered due to the considerable corrosion of apparatus parts resulting from the vapor phase operating conditions. No reference is known of attempts to operate the process at lower temperatures and under liquid phase conditions.

An object of this invention is to provide a process for the preparation of higher molecular weight organic compounds through the introduction of carbon monoxide into lower molecular weight organic compounds. A further object of the invention is to provide a process for the preparation in the liquid phase of carboxylic acids by the condensation of aliphatic alcohols with carbon oxides in the presence of a condensing agent.

A further object of the invention is to provide a process for the preparation of acids having the structural formulae $C_nH_{2n+1}COOH$, from alcohols having the structural formula $C_nH_{2n+1}OH$, by subjecting the alcohols to the action of carbon monoxide in the presence of a highly active condensing agent.

Other objects and advantages of the invention will hereinafter appear.

I have found that organic acids can be prepared by passing carbon monoxide into a liquid alcohol in the presence of a highly active condensing agent. The condensing agents which I have found most suitable for this purpose are the compounds containing boron and a halogen. Due, apparently, to the exceedingly high activity of these catalysts, the liquid alcohol rapidly absorbs the carbon monoxide to form the corresponding acid.

The alcohol-carbon monoxide liquid phase reactions which can be accelerated by the condensing agents of the present invention, in a manner which will be more carefully emphasized hereafter, may be expressed as follows:

$$C_nH_{2n+1}OH + CO \rightarrow C_nH_{2n+1}COOH$$

In accordance with the particular operating conditions, it will be found that, in some instances, the acids may not be formed directly in the free state, but may be produced as an ester by condensation of the acids formed with the particular alcohol used in the process, as indicated below:

$$C_nH_{2n+1}COOH + C_nH_{2n+1}OH \rightarrow C_nH_{2n+1}COOC_nH_{2n} + H_2O$$

My preferred condensing agent is boron fluoride which may be added to the alcohols, to be reacted, prior to the introduction of the carbon monoxide. Other compounds, and preferably volatile compounds, which contain boron and a halogen may be employed, such, for example, as dihydroxy fluoboric acid, borofluohydric acid, and, in general, the oxygenated acids obtained from mixtures of $H_2F_2$, $H_3BO_3$, etc. Boron fluoride, as well as the other condensing agents, may be used alone or in the presence of addition agents, such as, powdered nickel, nickel oxides, or other powdered metals or metal oxides which may be introduced to promote the activity of the condensing agent. Generally, however, I prefer to use boron fluoride alone for it is such a powerful condensing agent that promoters for further extending its condensing ability are not ordinarily necessary.

While I have indicated that boron fluoride is my preferred condensing agent and boron-halogen compounds are generally highly active, nevertheless, for the reaction of some alcohols with the carbon monoxide, other metal or metalloid halides may likewise be employed. Among these condensing agents are included the following anhydrous metal and non-metal halides: magnesium chloride, calcium chloride, titanium chloride, antimony chloride, and the chlorides, bromides, fluorides, and iodides of the above metals including boron as well as such halides of aluminum, beryllium, titanium, zirconium, hafnium, thorium, columbium, sulfur, silicon, phosphorus, tantalum, chromium, vanadium, and molybdenum.

My preferred condensing agents may be used in various proportions which are governed by the type of alcohol being treated. In the absence of addition agents they may be used in proportions ranging from 0.25 to 1.0 mol or higher per mol of the alcohol while in the presence of addition agents much lower amounts may be employed, say, generally, from 1 to 5% and, in some instances, higher percentages may be required. The activity of the addition agent determines in large measure the amount required, the particular alcohol or alcohols as well as the temperature and pressure conditions also being considered.

The synthesis can generally be efficiently carried out under the following operating conditions. The pressure may vary from atmospheric pressures up to 1000 atmospheres or even more. Generally, it appears preferable to operate in the neighborhood of from 350 to 750 atmospheres. The temperature within the reaction zone is not particularly critical for, with the highly efficient condensing agent used, the reaction will proceed from room temperature up to approximately 350° C. I prefer, however, to operate within the range of from 180–240° C., under which temperature conditions side reactions are minimized.

The carbon monoxide used may be obtained from various commercial sources, such, for example, as water gas, producer gas, coke oven gas, and the like, but to obtain products of the highest degree of purity it is preferable to remove from such commercial gases the objectionable constituents such as sulfur compounds, metal carbonyls, etc.

Furthermore, inert gases may be present in the carbon monoxide used and they are, in some instances, desirable. Nitrogen, for instance, has, it appears, little deleterious effect on the reaction or yield and, in fact may be used advantageously in order to aid in the agitation of the alcohol, particularly if the carbon monoxide is bubbled into the alcohol. Other strictly inert gases will usually act similarly to nitrogen. It is, of course, understood that instead of introducing an alcohol into the reaction chamber substances or mixtures of substances which decompose or react to form alcohols or esters may be employed, but generally I prefer to use a liquid alcohol.

Not only can methanol be condensed in the presence of carbon monoxide and my condensing agent to acetic acid or the reaction product of the acetic acid with methanol, i. e. methyl acetate, but the higher alcohols such as ethyl alcohol, propyl alcohol, butyl alcohol, including the secondary and tertiary alcohols such as isobutyl alcohol, tertiary butyl alcohol and even the higher molecular weight alcohols, such, for example, as hexyl alcohol or octyl alcohol, may be similarly converted to acids. The process is likewise applicable to the preparation of the polycarboxylic acids from the polyhydroxy alcohols such as ethylene glycol, propylene glycol, glycerin, and the like.

I shall now describe a specific embodiment of my process but it will be understood that the details therein given and the compounds employed, either as reactants or as condensing agents, in no way restrict the scope of the invention, but merely illustrate methods by which my process may be carried out.

*Example 1.*—Into a pressure-resisting autoclave containing methanol is passed directly a molecular equivalent weight of boron fluoride. The absorption of the boron fluoride by the methanol is conducted at room temperature and at ordinary pressure. To the resulting mixture carbon monoxide is added until a pressure of 700 atmospheres is attained. The temperature is held at approximately 200° C. and the reaction is continued until analysis shows that an equivalent weight of CO has been reacted. The reaction mixture yields, after decomposition with water, 75–80% of the amount of acetic acid theoretically obtainable according to the equation:

*Example 2.*—Ethanol may be reacted according to the conditions and procedure given in Example 1 with a yield, after decomposition with water, of 45–50% of the amount of propionic acid theoretically obtainable according the equation:

From a consideration of the above specification it will be realized that many changes may be made in the details therein given without departing from the invention or sacrificing any of the advantages that may be derived therefrom.

I claim:

1. A process for the preparation of organic acids which comprises reacting in the liquid phase an unsubstituted, saturated aliphatic alcohol and carbon monoxide in the presence of boron fluoride at a temperature below 350° C.

2. A process for the preparation of organic acids which comprises reacting in the liquid phase an unsubstituted, saturated aliphatic alcohol and carbon monoxide in the presence of borofluohydric acid at a temperature below 350° C.

3. A process for the preparation of organic acids which comprises reacting in the liquid phase an unsubstituted, saturated aliphatic alcohol and carbon monoxide in the presence of dihydroxyfluoboric acid at a temperature below 350° C.

4. A process for the preparation of acetic acid which comprises absorbing boron fluoride in methanol at approximately room temperature, and subjecting the resulting methanol-boron fluoride composition in the liquid phase to carbon monoxide at superatmospheric pressure, and subsequently removing the acetic acid formed.

5. A process for the preparation of organic acids which comprises intimately associating with a liquid unsubstituted, saturated aliphatic alcohol a catalytically effective concentration of combined boron and halogen atoms, and subsequently subjecting the associated mixture to the action of carbon monoxide while in the liquid phase and at a temperature below 350° C.

6. A process for the preparation of organic acids which comprises intimately associating a boron halide condensing agent with a liquid unsubstituted, saturated aliphatic alcohol, and subsequently subjecting the associated mixture to the action of carbon monoxide while in the liquid phase and at a temperature below 350° C.

7. A process for the preparation of organic acids which comprises intimately associating boron fluoride with a liquid unsubstituted, saturated aliphatic alcohol, and subsequently subjecting the associated mixture to the action of carbon monoxide while in the liquid phase and at a temperature below 350° C.

8. A process for the preparation of acetic acid which comprises intimately associating boron fluoride with liquid methanol and subsequently subjecting the associated mixture to the action of carbon monoxide while in the liquid phase and at a temperature below 350° C.

9. A process for the preparation of acetic acid which comprises passing a molecular equivalent weight of boron fluoride into a molecular weight of methanol, introducing carbon monoxide into the resulting mixture, and at a temperature of approximately 200° C. and a pressure of approximately 700 atmospheres continuing the reaction until approximately one molecular equivalent of carbon monoxide has been absorbed.

10. In a process for the preparation of aliphatic organic acids and their esters the step which comprises condensing carbon monoxide with a liquid containing one molecular equivalent of an unsubstituted, saturated aliphatic alcohol and one molecular equivalent of a boron halide.

11. In a process for the preparation of aliphatic organic acids and their esters the step which comprises reacting carbon monoxide with a liquid containing one molecular equivalent of methanol and one molecular equivalent of boron fluoride.

12. A process for the preparation of aliphatic organic acids and their esters which comprises reacting carbon monoxide with a liquid containing one molecular equivalent of ethanol and one molecular equivalent of boron fluoride.

13. The process of reacting, substantially in the liquid phase, an unsubstituted, saturated aliphatic alcohol and carbon monoxide in the presence of boron fluoride and thereby producing an aliphatic organic acid and its ester.

14. The process of reacting, substantially in the liquid phase, methanol with carbon monoxide in the presence of boron fluoride and thereby producing acetic acid and methyl acetate.

15. In a process for the preparation of aliphatic organic acids and their esters the step which comprises reacting carbon monoxide with a liquid containing one molecular equivalent of an unsubstituted, saturated aliphatic alcohol and from 0.25 to 1.0 molecular equivalent of boron fluoride.

16. In a process for the preparation of aliphatic organic acids and their esters the step which comprises contacting carbon monoxide with a liquid unsubstituted, saturated aliphatic alcohol and boron fluoride and effecting the reaction without substantial vaporization of the alcohol at a temperature of from 180 to 240° C.

17. A process for the preparation of organic acids which comprises contacting carbon monoxide with a liquid unsubstituted, saturated aliphatic alcohol and conducting the reaction in the presence of boron fluoride without substantial vaporization of the alcohol at a temperature ranging between 180 and 240° C. and at a pressure of from 350 to 700 atmospheres.

18. A process for the preparation of organic acids which comprises passing carbon monoxide into a liquid, unsubstituted, saturated aliphatic alcohols and condensing the alcohol and carbon monoxide in the solution without substantial vaporization of the alcohol at a temperature not exceeding 350 C., the reaction being catalyzed by at least a catalytically effective concentration of chemically combined boron and halogen atoms.

19. A process for the preparation of organic acids which comprises passing carbon monoxide into a liquid, unsubstituted, saturated aliphatic alcohol and condensing the alcohol and carbon monoxide in the solution without substantial vaporization of the alcohol at a temperature not exceeding 350° C., the reaction being effected in the presence of chemically combined boron and halogen atoms.

20. A process for the preparation of organic acids which comprises passing carbon monoxide into a liquid, unsubstituted, saturated aliphatic alcohol and reacting the alcohol with carbon monoxide in the solution, without substantial vaporization of the alcohol, at a temperature between 240 . C. and 350° C., the reaction being effected in the presence of boron fluoride.

DONALD J. LODER.